A. CLARK.
BEET DIGGER.
APPLICATION FILED MAR. 22, 1910.
971,253.
Patented Sept. 27, 1910.
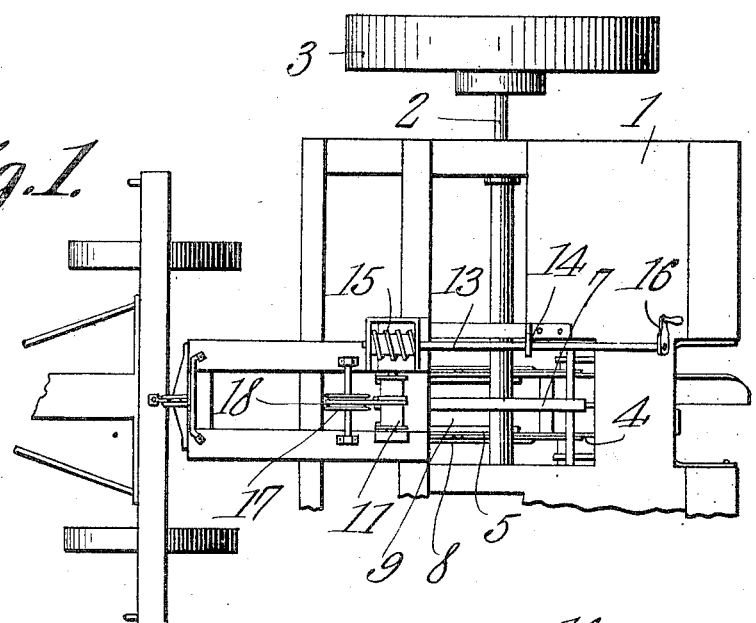
Fig. 1.
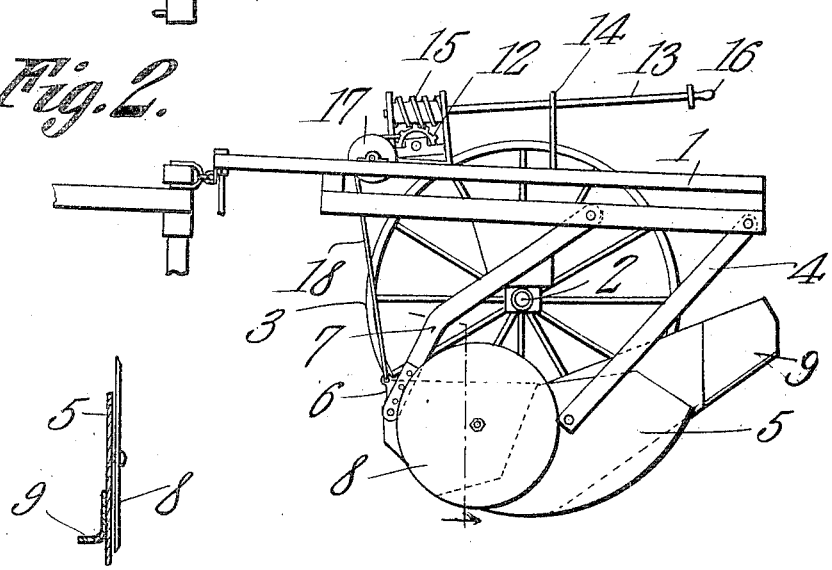
Fig. 2.
Fig. 3.
Witnesses
A. Easterday.
Inventor
Arnold Clark.
By C. A. Snow & Co.
Attorneys

UNITED STATES PATENT OFFICE.

ARNOLD CLARK, OF LATTY, OHIO.

BEET-DIGGER.

971,253.  Specification of Letters Patent. Patented Sept. 27, 1910.

Application filed March 22, 1910. Serial No. 550,967.

*To all whom it may concern:*

Be it known that I, ARNOLD CLARK, a citizen of the United States, residing at Latty, in the county of Paulding and State of Ohio, have invented a new and useful Beet-Digger, of which the following is a specification.

This invention has relation to a beet digger and it consists in the novel construction and arrangement of its parts as hereinafter shown and described.

The subject matter of the present invention is divided from my prior application filed in the United States Patent Office May 21, 1909, Serial No. 497,382.

The object of the invention is to provide a beet digger with a series of rotating knives which are adapted to cleave the soil at the sides of the row of beets and between which are located shares which are adapted to dig the beets and lift them to elevated position.

In the accompanying drawings:—Figure 1 is a top plan view of the beet digger; Fig. 2 is a side elevation of the same; Fig. 3 is a transverse sectional view of a portion of the same.

So much of the frame of the beet harvester is shown as will render it possible to understand the operation of the invention and in the accompanying drawings 1 indicates the frame of an ordinary beet harvester mounted upon an axle 2. In turn the axle 2 is mounted upon the ground or traction wheels 3. Arms 4 are pivotally connected at their upper rear ends with the frame 1 and are forwardly and downwardly disposed. Side pieces 5 form the lower forward portion of said digger and the forward ends of said side pieces are connected together by means of a yoke 6 which in turn is pivotally connected with the intermediate portion of the frame 1 by means of an arm 7. Cutting disks 8 are journaled for rotation against the sides of the side pieces 5 and are adapted to make incisions in the soil parallel with the line of row of plants as the implement is drawn along the same. Digging shares 9 are mounted upon the inner sides of the side pieces 5 and are of the usual width, shape and configuration and are similar to shares used in machines of this character. The rear portions of the digging shares 9 are upwardly inclined.

A winding drum 11 is journaled for rotation upon the frame 1 and is provided at one end of its shaft with a worm wheel 12. A shaft 13 is journaled in bearings 14 provided upon the frame 1 and is provided with a worm 15 which meshes with the wheel 12. At its opposite end the shaft 13 is provided with a crank member 16. An idle pulley 17 is journaled for rotation upon the frame 1 in advance of the winding drum 11. A chain 18 at one end winds upon the drum 11 and passes over the pulley 17 and at its lower end is connected with the yoke 6 above described. By this means it will be seen that when the shaft 13 is rotated the drum 11 will be rotated through the intermeshing worm wheel and worm 12 and 15 respectively and that the chain 18 is wound upon the drum 11 and the digging share on arms 4 will be raised or lowered upon its pivotal connections with the frame 1 and the arm 7 will be correspondingly raised or lowered. Thus means are provided for causing the diggers 9 to operate at any desired distance below the surface of the soil or for elevating said diggers entirely above the surface of the soil.

Having described the invention what I claim as new and desire to secure by Letters-Patent is:

1. A digger comprising a wheel mounted frame, two sets of arms pivoted at their upper ends to the frame, a digger proper pivoted to the lower ends of both sets of arms, disks journaled at the sides of the digger and adapted to cut incisions at the opposite sides of a row and means for raising and lowering the digger.

2. A digger comprising a wheel mounted frame, two sets of arms pivoted at their upper ends to said frame, side pieces pivoted to the lower ends of the hindmost set of arms, a yoke connecting the side pieces together, the foremost set of arms being pivotally connected with said yoke, means for raising and lowering the yoke, digging shares mounted upon the inner sides of said side pieces and disks journaled upon the outer sides of the side pieces and adapted to cut incisions in the soil at the opposite sides of the row.

In testimony that I claim the foregoing as my own, I have hereto affixed my signature in the presence of two witnesses.

his
ARNOLD X CLARK.
mark

Witnesses:
 IRVEN KYSER,
 E. P. SHAEFFER.